March 20, 1934.   J. SOUSEDÍK   1,951,566
UNIVERSAL INDUCTION REGULATOR
Filed June 22, 1932
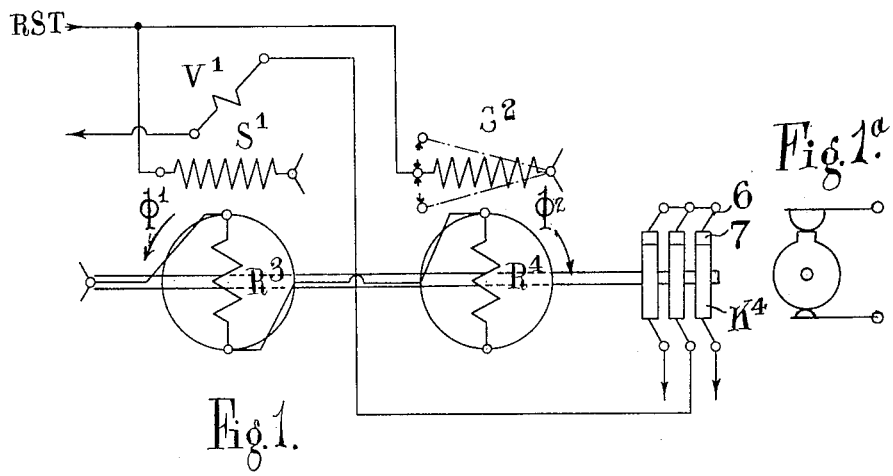
Fig.1.   Fig.1.ª
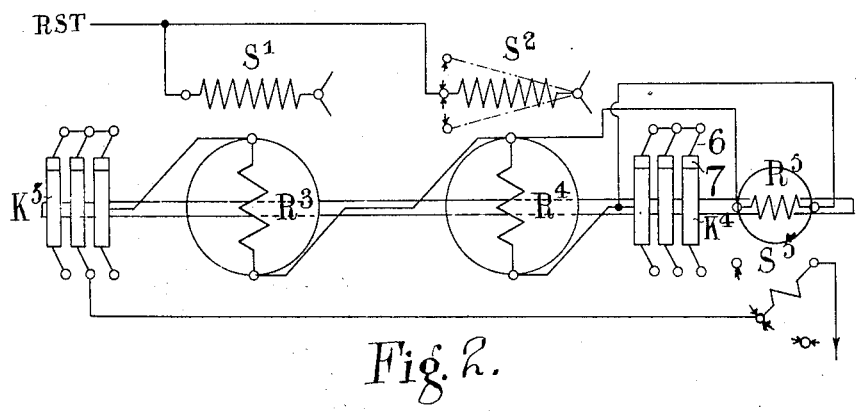
Fig.2.
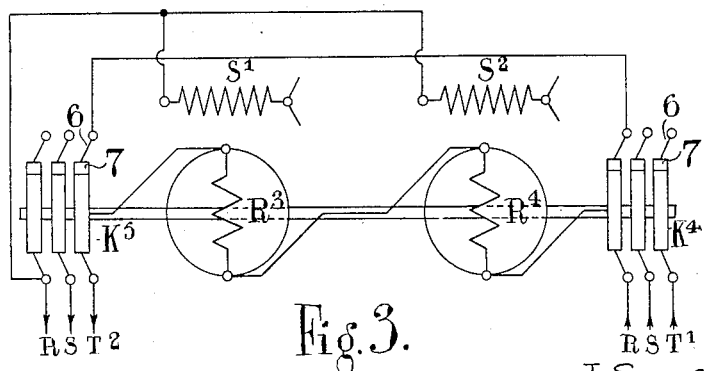
Fig.3.
J. Sousedík
INVENTOR
By: Marks & Clerk
Attys.

Patented Mar. 20, 1934

1,951,566

UNITED STATES PATENT OFFICE 1,951,566

UNIVERSAL INDUCTION REGULATOR

Josef Sousedík, Vsetin, Czechoslovakia

Application June 22, 1932, Serial No. 618,786
In Czechoslovakia April 13, 1931

5 Claims. (Cl. 172—246)

The subject matter of the present invention comprises improvements in and relating to induction regulators specially adapted for speed variation of A. C. motors of the commutator type and for restoring balanced conditions in multiphase systems.

Induction regulators for polyphase currents, consisting of two reciprocally revoluble stator and rotor windings are already known and serve for variation of the value and phase of voltages; such regulators are not, however, applicable for certain duties, e. g. for speed variation of commutator motors by impressing a variable voltage on the secondaries thereof, where a given magnetization current must be supplied for compensation of the wattless current of the motor at any given position of the regulator; this could not be obtained by regulators of the usual type. This disadvantage resulted in the impossibility of using induction regulators for motor control, where a phase displacement had to be effected in the proximity of synchronism.

Furthermore, induction regulators of the ordinary design cannot be applied for voltage equalization, as a phase displacement can occur in the main, which renders impossible e. g. a parallel operation of transformers.

All these disadvantages are removed by the arrangements according to the present invention. Other objects thereof will be apparent from the following description.

In the accompanying drawing, three diagrammatic views embodying the invention are shown. Figs. 1 and 2 show the connections of the regulator for speed regulation of commutator motors, Fig. 1$^a$ is a right side view of the slip rings and short circuiting device, Fig. 3 is an arrangement serving for voltage equalization.

In these figures are shown only the connections apertaining to one phase of the multiphase system; the single phases are interconnected in the usual manner.

The induction regulator consists, according to the invention, of two rotors (Fig. 1) keyed on a common revoluble shaft H; the rotor windings $R_3$ and $R_4$ are in series, while the stator windings $S_1$ and $S_2$ are connected in parallel. The magnetic fields produced by the stators rotate in opposite directions as indicated by the arrows 1 and 2 in Fig. 1. According to the position of both rotors with respect to the stators, the voltages induced therein are either added to or subtracted from one another, thus assuring a variation of voltage in magnitude but not in phase. The vector diagram has the usual scissor characteristic.

The phase displacement is obtained by shifting one stator winding only, as shown by dotted lines in Fig. 1; this produces a shifting of the corresponding voltage vector, while the voltage vector in the secondary $R_3$ remains in its former position. In plotting again both vectors, in order to obtain the resulting voltage, it may be seen, that the latter is altered not only as to its phase, but also as to its magnitude. Hence, by a mere shifting of the stator $S_2$ the resulting induced voltage varies in value; as, however, it is often required to vary the phase displacement without changing the value of the voltage it is necessary to provide means for a simultaneous shifting of both rotors through one half of the angle by which the stator $S_2$ has been shifted. After that, the resulting voltage varies only in phase. Hence, by shifting the rotors alone, the voltage in the secondaries may be varied only in magnitude, and by shifting the stator winding with a simultaneous displacement of the rotors, the induced voltage is varied only in phase. By such an arrangement, any given phase displacement and voltage may be obtained.

When the secondaries $R_3$ and $R_4$ are in the position shown in Fig. 1, the induced voltages acting in opposite directions are substantially compensated and the resulting voltage is zero; the secondaries may hence be entirely cut off in order to avoid a voltage drop due to ohmic and inductive losses. This may be effected e. g. by means of a short circuiting device 6, consisting of projections 7 set on the slip rings $K_4$ and of interconnected brushes. The short circuiting is effected only in the position shown in Fig. 1.

If the induction regulator has to be used for speed variation of commutator motors by impressing a variable voltage on the rotor, it is necessary that the secondaries of the regulator employed for said purpose should supply the required magnetization current also in the position of the regulator shown on Fig. 1, when these are short circuited and where no current at all would be supplied if no special provisions were made. This may be obtained by locating an auxiliary winding $V_1$ in common slots with the main winding of the fixed stator $S_1$ in such a position, as to induce therein the required magnetization current. This winding, the position of which is diagrammatically shown on Fig. 1, is connected in series with the corresponding phase of the secondary circuit XYZ and serves for supplying a constant current to the motor, whatever the position of the secondaries $R_3$ and $R_4$ may be.

If, however, it is necessary to vary the value of the said compensating current, the arrangement shown in Fig. 2 may be employed. Here, an auxiliary booster is employed, the rotor winding $R_5$ of which is fed secondarily by one of the rotors of the regulator, e. g. $R_4$, while the stator winding $S_5$ is set separately and may be shifted for the purpose of adjusting the compensating current as desired, when a sixphase system is employed. The rotor $R_5$ is set on the same shaft as the main rotors $R_3$ and $R_4$ of the regulator; the winding $R_5$ is constantly excited even when the regulator is short circuited, as shown in Fig. 2, for the purpose referred to above. The secondary winding $S_5$ excited by the rotor $R_5$ is connected in series in the main secondary circuit, behind the short circuiting device, so that even when the current supplied from the main rotors $R_3$ and $R_4$ is zero, the commutator motor is supplied with magnetization current for compensation purposes. This arrangement enables any desired adjustment of the phase displacement to be obtained even in the proximity of synchronism by a suitable shifting of the winding $S_5$.

When the universal induction regulator is employed for voltage equalization, the free ends of the series connected rotor windings are connected, as shown in Figure 3, with the corresponding phases of the supply i. e. on the fluctuating side $RST_1$ to the slip rings $K_4$, the slip rings $K_5$ delivering the regulated voltage at $RST_2$, and the stators $S_1$, $S_2$ being fed by the regulated side, without any phase displacement being possible, which is of great importance in the parallel operation of transformers.

This arrangement is illustrated in Figure 3, wherein there are six free ends of the series connected rotor windings $R_3$, $R_4$, three of them being connected to the slip rings $K_4$ and the other three to the slip rings $K_5$. Each of the slip rings is provided with a projection 7 by means of which, when the induction regulator is in the zero position, the rotor windings can be short-circuited, in order to eliminate, when the induction regulator is in this position, the unnecessary ohmic loss in the rotor, or the induction regulator can be disconnected from the network. In this case the brushes 6 are connected between the slip rings $K_4$, $K_5$ to the corresponding phases so that in the zero position of the induction regulator when the voltages annul one another, the secondary winding of each phase is short-circuited.

What I claim is:—

1. An induction regulator for any desired number of phases comprising two primaries connected in parallel in such a manner that their magnetic fields rotate in opposite directions, and two secondaries connected in series, the two secondaries being rotatable with respect to the primaries for varying the magnitude of the voltage, and one primary being rotatable with respect to the other primary for varying the phase of the voltage.

2. An induction regulator for any desired number of phases as claimed in claim 1, provided with a short circuiting device for the secondaries of the regulator to be short circuited when the induced voltages act in opposite directions and when the resulting voltage is substantially equal to zero.

3. An induction regulator according to claim 1 for speed control of commutator motors provided with a short circuiting device for the secondaries of the regulator to be short circuited when the induced voltages act in opposite directions and when the resulting voltage is substantially equal to zero, and an additional compensating winding located in common slots with the primary and connected in series with the secondary circuit, said compensating winding being so adjusted, that it delivers magnetization current to the commutator motor also when the secondaries of the regulator are short circuited.

4. An induction regulator according to claim 1 for use with a commutator motor, having a short circuiting device for the secondaries when the secondaries are in the position in which the resultant voltage is zero, in combination with an auxiliary stator and rotor, the primary of which is excited by one of the secondaries of the regulator, while its secondary is connected in series with the main secondary circuit of the regulator behind the short circuiting device, so that the magnetization current is supplied to the motor also when the secondaries of the regulator are short circuited, the auxiliary rotor being connected with the main rotor of the regulator in a relatively fixed position, while the stator is rotatably mounted for the purpose of adjustment of the phase displacement.

5. An induction regulator, according to claim 1 having the free ends of the series connected secondaries which constitute the rotors connected to slip rings, in combination with short circuiting devices associated with the said slip rings and dependent on the positions thereof, so that all the phases of the secondaries are short circuited at both free ends at the instant when the voltages annul one another.

JOSEF SOUSEDÍK.